United States Patent
Luo et al.

(10) Patent No.: US 9,741,092 B2
(45) Date of Patent: Aug. 22, 2017

(54) METHOD AND SYSTEM FOR IMAGE RESIZING BASED ON INTERPOLATION ENHANCED SEAM OPERATIONS

(75) Inventors: Ying Luo, Stevenson Ranch, CA (US); Ju Guo, Arcadia, CA (US)

(73) Assignee: THOMSON LICENSING, Issy-les-Moulineaux (FR)

( * ) Notice: Subject to any disclaimer, the term of this patent is extended or adjusted under 35 U.S.C. 154(b) by 385 days.

(21) Appl. No.: 12/998,387

(22) PCT Filed: Oct. 29, 2008

(86) PCT No.: PCT/US2008/012282
§ 371 (c)(1),
(2), (4) Date: Apr. 13, 2011

(87) PCT Pub. No.: WO2010/050911
PCT Pub. Date: May 6, 2010

(65) Prior Publication Data
US 2011/0200274 A1    Aug. 18, 2011

(51) Int. Cl.
*G06K 9/32* (2006.01)
*G06T 3/00* (2006.01)

(52) U.S. Cl.
CPC .................. *G06T 3/0012* (2013.01)

(58) Field of Classification Search
USPC ............... 382/276, 294, 162, 254, 298–300; 358/1.9, 3.05, 3.06
See application file for complete search history.

(56) References Cited

U.S. PATENT DOCUMENTS

| | | | |
|---|---|---|---|
| 5,881,205 A | | 3/1999 | Andrew et al. |
| 7,477,800 B2* | | 1/2009 | Avidan et al. ............... 382/298 |
| 7,747,107 B2* | | 6/2010 | Avidan et al. ............... 382/298 |
| 8,213,745 B2* | | 7/2012 | Kumar et al. ............... 382/298 |
| 8,373,802 B1* | | 2/2013 | Gross et al. ................. 348/700 |
| 2008/0143744 A1 | | 6/2008 | Agarwala |
| 2008/0267528 A1* | | 10/2008 | Avidan et al. ............... 382/276 |
| 2010/0328352 A1* | | 12/2010 | Shamir et al. ............... 345/661 |
| 2011/0085745 A1* | | 4/2011 | Kumar et al. ............... 382/298 |
| 2011/0091132 A1* | | 4/2011 | Kumar et al. ............... 382/298 |

(Continued)

FOREIGN PATENT DOCUMENTS

| | | | |
|---|---|---|---|
| EP | 1968008 | * | 9/2008 |
| JP | 2008217765 | | 9/2008 |

OTHER PUBLICATIONS

Rubinstein, M., Shamir, A., Avidan, S. 2008. Improved Seam Carving for Video Retargeting. ACM Trans. Graph. 27, 3, Article 16 (Aug. 2008), 9 pages.*

(Continued)

*Primary Examiner* — Andrae S Allison
(74) *Attorney, Agent, or Firm* — Brian J. Dorini; Lily Neff

(57) ABSTRACT

Methods and systems for resizing an image utilizing content-aware seam operations include defining low-energy seams defining contextually less-important information and utilizing such information for interpolation based on one-dimensional manifolds. The interpolation can form new seams and/or regenerated pixels that can be combined with the image to provide a content-aware resized image exhibiting smooth and continuous features.

11 Claims, 5 Drawing Sheets

(56) References Cited

U.S. PATENT DOCUMENTS

2012/0120311 A1* 5/2012 De Haan .................. 348/441
2012/0121204 A1* 5/2012 Ding et al. ................ 382/260

OTHER PUBLICATIONS

Conger, D. D., Kumar, M., and Radha, H., "Multi-seam carving via seamlets," in Proc. Of the SPIE, vol. 7870, article id. 78700H, 2011, 7 pp.*

Thilagam et al, Optimized Image Resizing using Piecewise Seam Carving, International Journal of Computer Applications (0975-8887) vol. 42—No. 14, Mar. 2012.*

Avidan S et al: "Seam Carving for Content-Aware Image Resizing" ACM Transactions on Graphics, ACM, US, vol. 26, No. 3, Jul. 1, 2007 (Jul. 1, 2007). pp. 10-11, ISSN: 0730-0301 the whole document XP007904203.

Search Report dated Aug. 20, 2009.

Avidan et al., "Seam Carving for Content-Aware Image Resizing," ACM Transactions on Graphics, vol. 26, No. 3, Article 10, Jul. 2007.

\* cited by examiner

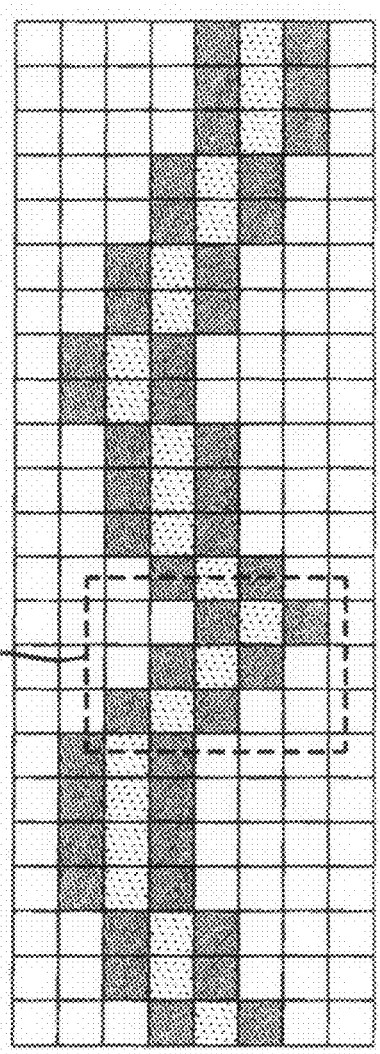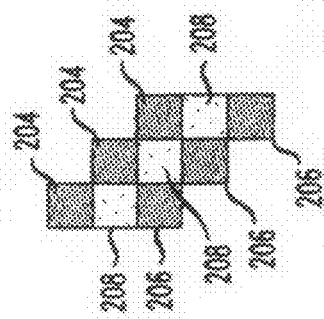
FIG. 2

METHOD AND SYSTEM FOR IMAGE RESIZING BASED ON INTERPOLATION ENHANCED SEAM OPERATIONS

This application claims the benefit, under 35 U.S.C. §365 of International Application PCT/US2008/12282, filed Oct. 29, 2008 which was published in accordance with PCT Article 21(2) on May 6, 2010 in English.

TECHNICAL FIELD

The present principles generally relate to image resizing, and more particularly, to methods and systems for resizing images by employing seam operations.

BACKGROUND

Traditional methods of image resizing involve scaling an image without regard to its content. Reducing the size of an image using such methods oftentimes renders objects in the image indistinguishable. As a result, techniques have been developed to retain contextually important features of an image during resizing, while disregarding less important features of an image.

One such technique utilizes seam operations to identify contextually less important features in an image during a resizing operation. Avidan, Shai and Shamir, Ariel, *Seam Carving for Content-Axare Image Resizinq*, SIGGRAPH'07 Session Image Slicing & Stretching, 2007, describes seaming operations in which low-energy seams are defined and removed to reduce an image size. In Avidan, a seam is defined as an 8-connected curve extending vertically, from top to bottom, or extending horizontally, from the left side to the right side of the image. A pixel-wise energy map is pre-calculated, where energy is defined as the gradient intensity or as other energy measures. The lowest energy curves in the horizontal and/or vertical directions are determined by dynamic programming. To reduce the size of the image, the lowest energy curves are removed, as critical image contents are unlikely to be presented in low energy sections of the image. Enlarging the size of the images can be similarly performed by seam insertion.

Seam operations described in Avidan achieve content awareness, as the critical objects or scenes will be maintained while the image resized. Further, because the seams extend across height and/or width of the image, the image size is uniformly changed during resizing operations.

However, while known seam operations maintain content awareness, they introduce discontinuity or abruptness as seams are increasingly removed or added for image resizing. Inevitably, higher energy seams are removed while an image is progressively reduced, resulting in loss of content details. Similarly, while an image is enlarged, added seams do not adequately include content details that effectively correlate with surrounding image features.

SUMMARY

A method, apparatus and system in accordance with various embodiments of the present principles are directed at least in part to addressing the deficiencies of the prior art by providing methods and systems including interpolation schemes to ensure that continuity and smoothness is retained upon resizing an image.

In one embodiment of the present principles, a method for resizing an image includes defining a low-energy seam in the image, determining seams neighboring the low-energy seam, interpolating neighboring seams into a new seam and combining the new seam to the image to resize the image.

In an alternate embodiment of the present principles, a method for resizing an image includes defining a low-energy seam in the image, determining neighborhoods of pixels surrounding each pixel in the low-energy seam, resizing the image and regenerating at least one pixel in each neighborhood by interpolating pixels that are adjacent to the pixel that is to be regenerated.

In an alternate embodiment of the present principles, a system for resizing an image includes a low-energy seam detection module configured to define a low-energy seam in the image and to determine seams neighboring the low-energy seam, an interpolator configured to interpolate neighboring seams into a new seam and an image regenerator configured to combine the new seam to the image to resize the image.

BRIEF DESCRIPTION OF THE DRAWINGS

The teachings of the present principles can be readily understood by considering the following detailed description in conjunction with the accompanying drawings, in which:

FIG. 2 depicts a pixel wise energy map illustrating a seam operation and interpolation for horizontal seams based on a one-dimensional manifold in accordance with an embodiment of the present principles;

Figure 1:
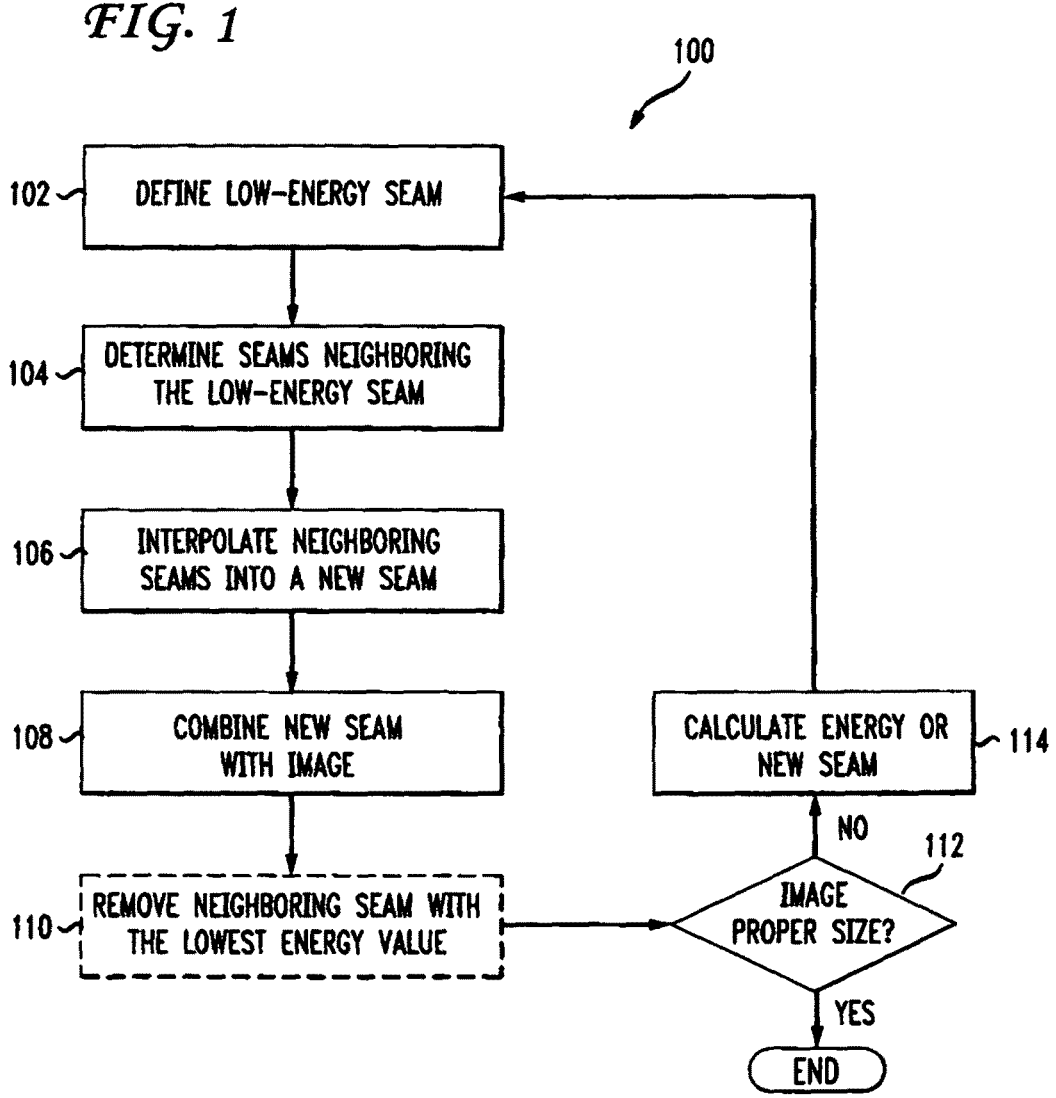
FIG. 1 depicts a high level flow diagram of a method for resizing an image by interpolating seams neighboring a low-energy seam in accordance with an embodiment of the present principles.

It should be understood that the drawings are for purposes of illustrating the concepts of the present principles and are not necessarily the only possible configuration for illustrating the present principles. To facilitate understanding, identical reference numerals have been used, where possible, to designate identical elements that are common to the figures.

DETAILED DESCRIPTION

Embodiments of the present principles advantageously provide methods and systems for resizing an image by utilizing interpolation enhanced seam operations in accordance with various embodiments of the present invention. Although the present principles will be described primarily within the context of an image resizing system, the specific implementations of the present principles should not be treated as limiting the scope of the present principles. It will be appreciated by those skilled in the art and informed by the teachings of the present principles that the concepts of the present principles can be advantageously applied in other types of data representations. For example, the concepts of the present principles can be implemented in images included in video files.

The functions of the various elements shown in the figures can be provided through the use of dedicated hardware as well as hardware capable of executing software in association with appropriate software. When provided by a processor, the functions can be provided by a single dedicated processor, by a single shared processor, or by a plurality of individual processors, some of which can be shared. Moreover, explicit use of the term "processor" or "controller" should not be construed to refer exclusively to hardware capable of executing software, and can implicitly include, without limitation, digital signal processor ("DSP") hardware, read-only memory ("ROM") for storing software, random access memory ("RAM"), and non-volatile storage. Moreover, all statements herein reciting principles, aspects, and implementations of the present principles, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those skilled in the art that the block diagrams presented herein represent conceptual views of illustrative system components and/or circuitry embodying the present principles. Similarly, it will be appreciated that any flow charts, flow diagrams, state transition diagrams, pseudocode, and the like represent various processes which can be substantially represented in computer readable media and so executed by a computer or processor, whether or not such computer or processor is explicitly shown.

Referring now in specific detail to the drawings in which like reference numerals identify similar or identical elements throughout the several views, and initially to FIGS. 1 and 2, an exemplary method 100 for resizing an image using interpolation enhanced seam operations in accordance with an embodiment of the present invention is illustrated. Aspects of the present principles are described herein with respect to an image represented by a square array in which each square corresponds to a pixel. However, it should be noted that other image portion sizes and configurations can be employed in various embodiments of the present principles. Thus, use of the term "pixel" herein incorporates other suitable image portion sizes and configurations.

In accordance with one embodiment of the present principles, method 100 can be implemented to reduce the size of an image. The method 100 begins at step 102 in which a low-energy seam in an image is defined as discussed above. That is, a seam is defined as an 8-connected curve extending vertically, from top to bottom, or extending horizontally, from the left side to the right side of the image. In accordance with the present invention, a pixel-wise energy map is pre-calculated, where energy is defined as the gradient intensity or as other energy measures. The low-energy seam can comprise the seam with the lowest energy among the seams of the image being resized. For example, in one embodiment, the low-energy seam can be the lowest energy horizontal one-dimensional manifold on the image satisfying an 8-connection property. In previous seam operation resizing methods, the low-energy seam is simply removed and pixels below it are shifted up by one pixel, resulting in abruptness and discontinuity. To ensure that continuity and smoothness are retained upon resizing an image in accordance with the present invention, neighboring seams or pixels can be interpolated in accordance with one or more aspects of the present principles. For example, the method can then proceed to step 104.

At step 104, seams neighboring the low-energy seam are determined. For example, with respect to horizontal seams, the low-energy seam determined in step 102 can be defined as a digitized curve according to equation one (1), which follows:

$$S_H = \{t_i:(x_i,y_i) | 1 \le i \le w, |x_i - x_{i-1}| \le 1, |y_i - y_{i-1}| \le 1\}, \quad (1)$$

wherein $S_H$ is the horizontal seam, t is the set of points on the seam, $(x_i, y_i)$ are the coordinates of point $t_i$, and w is the width of the image in units of pixels. As illustrated by equation (1), the low-energy seam can be composed of w pixels. An example of a low-energy seam is depicted in the dotted portion 202 of FIG. 2 as the lighter shaded portion.

The seams neighboring the low-energy seam can be determined by the following relation depicted in equation two (2), which follows:

$$S_{Hn} = \{t_{ni}:(x_{ni},y_{ni}) | 1 \le i \le w, |x_{ni} - x_i| = 0, |y_{ni} - y_i| = 1\}, \quad (2)$$

wherein $S_{Hn}$ are neighboring horizontal seams, $t_n$ is the set of pixels on the neighboring seams, $(x_{ni}, y_{ni})$ are the coordinates of point $t_{ni}$, $(x_i, y_i)$ are the coordinates of pixels on the low-energy seam, and w is the width of the image in units of pixels. Thus, two neighboring seams satisfy the relation of equation (2), where one neighboring seam is the set of pixels directly above the low-energy seam pixels in the same columns as the low-energy seam pixels and another neighboring seam is a second set of pixels directly below the low-energy seam pixels in the same columns as the low-energy seam pixels. As illustrated in FIG. 2, seams 204 and 206 correspond to neighboring horizontal seams.

Similarly, vertical seams neighboring a low-energy vertical seam can be determined in step 104. For example, with respect to vertical seams, the low-energy seam determined in step 102 can be defined as a digitized curve according to equation three (3), which follows:

$$S_V = \{r_j:(x_j,y_j) | 1 \le j \le h, |x_j - x_{j-1}| \le 1, |y_j - y_{j-1}| \le 1\}, \quad (3)$$

wherein $S_V$ is the vertical seam, r is the set of points on the seam, $(x_i, y_i)$ are the coordinates of point $r_i$, and h is the height of the image in units of pixels. The seams neighboring the vertical low-energy seam can be determined according to equation four (4), which follows:

$$S_{Vn} = \{r_{nj}:(x_{nj},y_{nj}) | 1 \le j \le h, |x_{nj} - x_j| = 1, |y_{nj} - y_j| = 0\}, \quad (4)$$

wherein $S_{Vn}$ are neighboring seams, $r_n$ is the set of pixels on the neighboring seams, $(x_{nj}, y_{nj})$ are the coordinates of point $r_{nj}$, $(x_j, y_j)$ are the coordinates of pixels on the low-energy seam, and h is the height of the image in units of pixels. Similar to the horizontal seam example, two seams satisfy equation (4), where one neighboring seam is the set of pixels directly to the right of the low-energy seam pixels in the same rows as the low-energy seam pixels and another neighboring seam is a second set of pixels that is directly to the left of the low-energy seam pixels in the same rows as the low-energy seam pixels. The method 100 can then proceed to step 106.

At step 106, neighboring seams can be interpolated to form a new seam. Unlike known interpolation methods in which interpolation is formed exclusively on a uniform gird, interpolation methods in accordance with one or more embodiments of the present principles are based on one-dimensional manifolds in a two dimensional image plane. In this way, the interpolation can be based on a grid defined by a seam curve. For example, with respect to the horizontal neighboring seams, the neighboring seams can be interpolated to form a new seam in accordance with equation five (5), which follows:

$$t'_i = \frac{\sum_{k=1}^{P} \lambda_k t_{nk}}{\sum_{k=1}^{P} \lambda_k}, \quad (5)$$

wherein P is the number of pixels involved in the interpolation, $\lambda_k$ is a weighing factor for each pixel $t_{nk}$ neighboring the horizontal low-energy seam and $t'_i$ is the set of pixels corresponding to the new seam. The weighing factor $\lambda_k$ can be defined as a function of a neighboring pixel's energy $e_k$ and its distance $d_k$ to the pixel $t_i$ on the low-energy seam corresponding to according to equation six (6), which follows:

$$\lambda_k = f(e_k, d_k), \quad (6)$$

wherein f( ) is a monotonically increasing function of $e_j$ and is a monotonically decreasing function of $d_k$. In accordance with an embodiment of the present invention, a simple example of the function, f( ) can be characterized according to equation seven (7), which follows:

$$f(e_k, d_k) = \frac{e_k}{d_k}. \quad (7)$$

Similarly, with regard to vertical seams, neighboring seams can be interpolated to form a new seam in accordance with equation eight (8), which follows:

$$r'_i = \frac{\sum_{k=1}^{P} \lambda_k r_{nk}}{\sum_{k=1}^{P} \lambda_k}, \quad (8)$$

wherein P is the number of pixels involved in the interpolation, $\lambda_k$ is a weighing factor, described above, for each pixel $r_{nk}$ neighboring the vertical low energy seam and $r'_i$ is the set of pixels corresponding to the new seam.

An example of a new seam formed by interpolating neighboring seams is provided in FIG. 2 as seam 208, which is a weighted average of the neighboring six pixels in seams 204 and 206. The method 100 can then proceed to step 108.

At step 108, the new seam formed from interpolation is combined with the image. In accordance with an embodiment of the present principles in which the size of the image is reduced, the new seam can replace the low-energy seam. The method 100 can then proceed to step 110.

At step 110, the neighboring seam with the lowest energy among the neighboring seams is removed. For example, removal of a horizontal neighboring seam with the lowest energy can reduce the image height to h-1. Similarly, removal of a vertical neighboring seam with the lowest energy can reduce the image width to w-1, in units of pixels. The energy of the two neighboring seams can be calculated from a pre-computed energy map. Rather than simply removing the low-energy seam, a continuous and smoother image is retained due to an amalgamated new seam in accordance with the above described embodiment of the present invention. The method can then optionally proceed to step 112.

At step 112, it is determined whether the image is the desired size. If the image is the desired size, then the method 100 can be exited. However, if the image is not the desired size, the method can proceed to step 114.

At step 114, the energy of the new seam can be calculated for further processing to reconfigure the picture to a desired size. That is, thereafter, steps 102-112 can be repeated.

To resize an image in a proportional manner in accordance with an embodiment of the present principles described herein, both horizontal and vertical resizing can be performed. For example, in one embodiment of the present invention, method 100 can be performed between horizontal and vertical seams and interpolation operations of the present invention can be performed until a desired size is reached.

While method 100 has been described with respect to reducing the size of an image, method 100 can also be utilized to increase the size of an image in accordance with alternate embodiments of the present invention. For example, in an embodiment of the present invention for increasing the size of an image, steps 102-106 can be performed as described above. The method 100 can then proceed to step 108.

At step 108, the new seam formed from interpolation is combined with the image. In this embodiment, the new seam can be added in a position adjacent to the low-energy seam to increase the image height to h+1 if horizontal resizing is performed, or to increase the image width to w+1 if vertical resizing is performed. Subsequently, step 110 can be skipped and steps 112 and 114 can be performed as described above.

Figure 3:
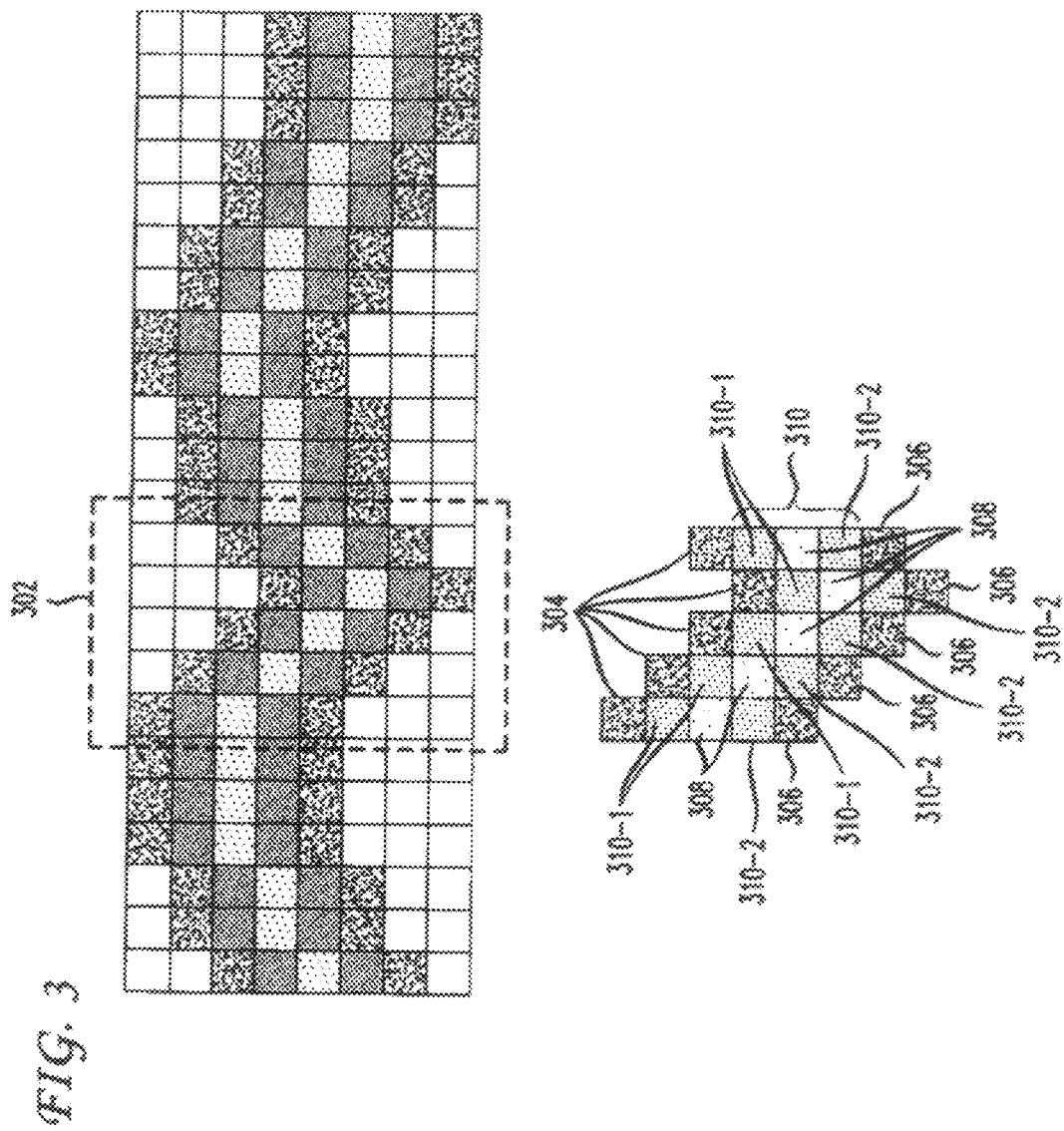
FIG. 3 depicts a pixel wise energy map illustrating a seam operation and interpolation for a horizontal seam band in accordance with an embodiment of the present principles.

Referring to FIG. 3 with continuing reference to FIG. 1, in an alternate embodiment of the present principles, the low-energy seam can comprise a seam band. That is, seam operations can involve extensive computation if seam widths are one pixel and carving of different seams are performed independently. For example, definition of a seam can be found by utilizing a heavy-computation based global optimization method dynamic programming scheme. To reduce the computation utilized to resize an image, the low-energy seam and/or neighboring seams can correspond to a width that is larger than one pixel. An example of a seam band is depicted in the dotted portion 302 of FIG. 3 as the two lighter shaded portions.

As stated above, the low-energy seam can be a one dimensional manifold, in either the horizontal or vertical direction with the lowest energy in an image. Because of the continuity of the image, the approximate area around a seam with a width of one pixel has a high probability of having low energy. Thus, in accordance with one embodiment of the present principles, a seam band can be removed or added to expedite the resizing process while retaining continuity and smoothness of an image by utilizing interpolation methods in accordance with the present invention and as described herein.

Referring again to FIG. 1 with continuing reference to FIG. 3, an image reduction process utilizing seam bands is described herein. At step 102; a low-energy seam can be defined. In this implementation, the low-energy seam comprises a seam band with a width of N+1 for horizontal seam bands or M+1 for vertical seam bands in units of pixels. The width of the seam band is determined in accordance with a desired quality of a resized image. The central seam of the seam band can correspond to the seam with the lowest energy among the seams of the image being resized. For example, the central seam can be defined by equation (1) for horizontal seams and can be defined by equation (3) for vertical seams, described above. A horizontal seam band can be defined, in addition to the central seam, by pixels satisfying the equation nine (9), which follows:

$$B_H = \left\{ t_{Bi}: (x_{Bi}, y_{Bi}) \mid 1 \le i \le w, |x_{Bi} - x_i| = 0, |y_{Bi} - y_i| \le \frac{N}{2} \right\}, \quad (9)$$

where the central seam is defined by equation (1), $t_B$ is the set of pixels on the seam band in addition to the central seam, $(x_{Bi}, y_{Bi})$ are the coordinates of point $t_{Bi}$, $(x_i, y_i)$ are coordinates of pixels on the central seam, w is the width of the image in units of pixels, and the width of the seam band is N+1 in units of pixels. Similarly, a vertical seam band can be defined, in addition to the central seam, by pixels satisfying the equation ten (10), which follows:

$$B_V = \left\{ r_{Bi}: (x_{Bj}, y_{Bj}) \mid 1 \le j \le h, |x_{Bj} - x_j| \le \frac{M}{2}, |y_{Bj} - y_j| = 0 \right\}, \quad (10)$$

where the central seam is defined by equation (3), $r_B$ is the set of pixels on the seam band in addition to the central seam, $(x_{Bj}, y_{Bj})$, are the coordinates of point $r_{Bi}$, $(x_j, y_j)$ are coordinates of pixels on the central seam, h is the height of the image in units of pixels, and the width of the seam band is M+1 in units of pixels.

Thus, for horizontal seam bands, the seam band can be delineated by N/2 pixels above each pixel of the central seam of the seam band in the same column and N/2 pixels below each pixel of the central seam of the seam band in the same column. Similarly, for vertical seam bands, the seam band can be delineated by M/2 pixels to the right each pixel of the central seam of the seam band in the same row and M/2 pixels to the left of each pixel of the central seam of the seam band in the same row. As stated above, seam band 302 in FIG. 3 is one example of a horizontal seam band. For seam band 302 of FIG. 3, N is 2.

At step 104, seams neighboring the low-energy seam are determined. For horizontal seam bands, the seams neighboring the low-energy seam can be defined by equation eleven (11), which follows:

$$B_{Hn} = \left\{ t_{Bni}: (x_{Bni}, y_{Bni}) \mid 1 \le i \le w, |x_{Bni} - x_i| = 0, |y_{Bni} - y_i| = \frac{N}{2} + 1 \right\}, \quad (11)$$

wherein $B_{Hn}$ are neighboring seams, $t_{Bn}$ is the set of pixels on the neighboring seams, $(x_{Bni}, y_{Bni})$, are the coordinates of point $t_{bni}$, $(x_i, y_i)$ are the coordinates of pixels on the central seam of the low-energy seam, w is the width of the image in units of pixels, and the width of the low-energy seam is N+1. Two neighboring seams satisfy the relation of equation (11), in which one neighboring seam is a set of pixels directly above the low-energy seam pixels in the same columns as the low-energy seam pixels and second neighboring seam is a set of pixels is directly below the low-energy seam pixels in the same columns as the low-energy seam pixels. As illustrated in FIG. 3, seams 304 and 306 correspond to neighboring seams.

For vertical seam bands, seams neighboring the vertical low-energy seam can be determined according to equation twelve (12), which follows:

$$B_{Vn} = \left\{ r_{Bnj}: (x_{Bnj}, y_{Bnj}) \mid 1 \le j \le h, |x_{Bnj} - x_j| = \frac{M}{2} + 1, |y_{Bnj} - y_j| = 0 \right\}, \quad (12)$$

wherein $B_{Vn}$ are neighboring seams, $r_{Bn}$ is the set of pixels on the neighboring seams, $(x_{Bnj}, y_{Bnj})$ are the coordinates of point $r_{Bnj}$, $(x_j, y_j)$ are the coordinates of pixels on the low-energy seam, h is the height of the image in units of pixels, and the width of the low-energy seam is M+1. Similar to the horizontal seam example, two seams satisfy equation (12), where one neighboring seam is the set of pixels directly to the right of the low-energy seam pixels in the same rows as the low-energy seam pixels and a second neighboring seam is a set of pixels that is directly to the left of the low-energy seam pixels in the same rows as the low-energy seam pixels.

At step 106, the neighboring seams are interpolated to form a new seam. For example, equations 5, 6 and 8 can be employed to form new seams, with $t_{nk}$ replaced by $t_{Bnk}$ and $r_{nk}$ replaced by $r_{Bnk}$. For example, the result of the application of equations 5, 6 and/or 8, 6 can form a seam with a seam width of one pixel. Seam 308 in FIG. 3 is one example of a new seam formed by interpolation of seams 304 and 306.

At step 108, the new seam formed from interpolation is combined with the image. In accordance with an embodiment of the present principles in which the size of the image is reduced, the new seam can replace the low-energy seam. Here, the low-energy seam is a seam band with a width greater than one pixel. Thus, replacing the seam band with the new seam reduces the image size to a height of h−2 pixels for horizontal seam operations and a width of w−2 pixels for vertical seam operations.

Optionally, at step 110, the neighboring seam with the lowest energy among the neighboring seams is removed. Thus, if step 110 is performed, the image size can be reduced to a height of h−3 pixels for horizontal seam operations and a width of w−3 pixels for vertical seam operations.

Steps 112 and 114 can be performed as discussed above. The method can be repeated until a desired image size is attained.

Furthermore, the described method of the present invention can also be employed to increase the size of an image using a low-energy seam that comprises a seam band. For example, steps 102-106 can be performed as described above. Subsequently the method can proceed to step 108.

At step 108, the new seam formed from interpolation is combined with the image. The new seam can replace the low-energy seam. For example, a new horizontal seam of a single pixel width can be multiplied to form a horizontal seam band of width N+1. Similarly, a new vertical seam of a single pixel width can be multiplied to form a seam band of width M+1 for vertical seam bands. With reference to FIG. 3, new horizontal seam 308 can be multiplied to a width of 3 to form horizontal seam 310, which includes 3 parallel and equal seams 310-1, 308, and 310-2. Further, to increase the image size, the width of seam 310 can be increased by adding a number of parallel seams equal to the new seam 308 between neighboring seams 304 and 308. Thus, the width of the new seam can be adjusted to a width of N+a to increase the image height to h+(a−1) if horizontal resizing is performed. Similarly, the width of the new seam can be adjusted to a width of M+b to increase the image width of w+(b−1) if vertical resizing is performed.

Subsequently, step 110 can be skipped and steps 112 and 114 can be carried out as described above.

According to an alternate embodiment of the present principles, interpolation can be performed after employing seam operations to resize an image.

Figure 4:
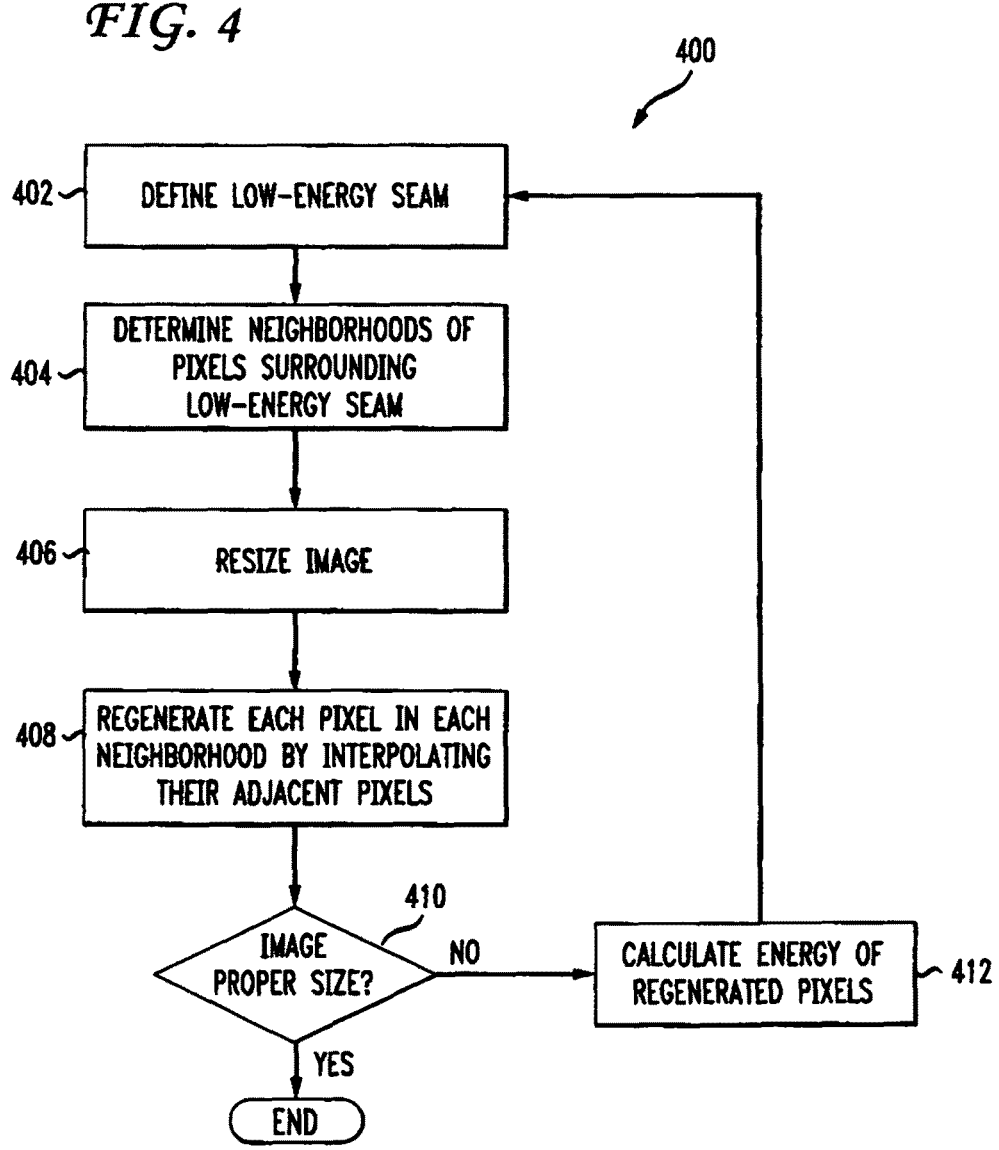
FIG. 4 depicts a high level flow diagram of a method for resizing an image by interpolating pixels adjacent to pixels in a neighborhood surrounding pixels in a low-energy seam in accordance with an embodiment of the present principles.

Referring to FIG. 4, a high-level flow diagram for exemplary method for resizing an image in accordance with an embodiment of the present principles is illustrated. The method begins at step 402 in which a low-energy seam in an image is defined as previously described. The low-energy seam can have a single pixel width and/or can be a seam band. The method then proceeds to step 404.

At step 404, neighborhoods of pixels surrounding each pixel in the low energy seam are determined. For example, in one specific implementation of the present principles, a neighborhood can be defined by a 3×3 square centered by pixels in the seam. Further, binary maps representing pixels in the neighborhood can be generated. For example, one binary map can be generated for horizontal seams and one binary map can be generated for vertical seams. The method then proceeds to step 406.

At step 406, the image can be resized. For example, if the image size is reduced, then the low-energy seam can be removed. If the image size is increased, then a duplicate of the low-energy seam can be added in a position adjacent to the low-energy seam. For example, if the low-energy seam is a horizontal seam, then the duplicate pixels can be added directly above or below pixels in the low-energy seam in the same columns as pixels in the low-energy seam. If the low-energy seam is a vertical seam, then the duplicate pixels can be added directly to the right or the left of pixels in the low-energy seam in the same rows as pixels in the low-energy seam. Moreover, more than one duplicate can be added to the image to increase its image size. The method then proceeds to step 408.

At step 408, each pixel of each neighborhood is regenerated by interpolating their adjacent pixels. For example, as discussed above, binary maps can be generated to represent pixels in a neighborhood surrounding each pixel in a low-energy seam. The neighborhood pixels can be flagged as "1" and non-neighborhood pixels are flagged as "0". Thus, for each neighborhood pixel, the neighborhood pixels can, in accordance with one embodiment, be regenerated to a resized Image, I(l,m), in accordance with equations thirteen (13) and fourteen (14), which follow:

$$\text{if } MAP_v(1, m) = 1, \quad (13)$$
$$I(l, m) = \frac{I(l-1, m) + 2I(l, m) + I(l+1, m)}{4},$$

$$\text{if } MAP_h(1, m) = 1, \quad (14)$$
$$I(l, m) = \frac{I(l, m-1) + 2I(l, m) + I(l, m+1)}{4},$$

wherein $MAP_v(l,m)$ and $MAP_h(l,m)$ represent the vertical and horizontal binary maps, respectively. The regenerated pixels replace their corresponding pixels in the content-aware resized image to form a smooth and continuous image. The method proceeds to step 410.

At step 410, it is determined whether the image is the desired size. If the image is the desired size, then the method can be exited. However, if the image is not the desired size, the method can proceed to step 412.

At step 412, the energy of the regenerated pixels can be calculated for further processing to configure the image to a desired size. That is, thereafter, steps 402-410 can be repeated.

As stated above, in various embodiments of the present invention, to resize an image in a proportional manner, both horizontal and vertical resizing can be performed. For example, one suitable configuration is to alternate the performance of the above described method, method 400, of the present invention between horizontal and vertical seam and the performance of the interpolation operations until a desired size is reached.

Figure 5:
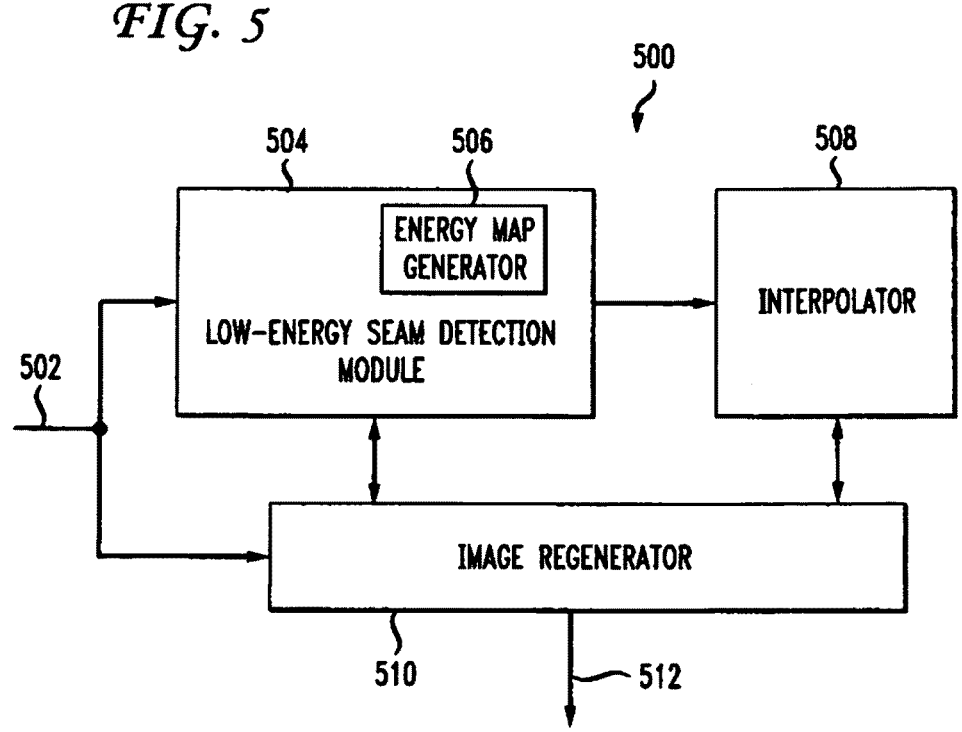
FIG. 5 depicts a high level block diagram of a system for resizing an image in accordance with an embodiment of the present principles.

Referring now to FIG. 5 with continuing reference to FIGS. 1 and 4, a system 500 for resizing an image in accordance with an embodiment of the present principles is illustrated. The system 500 of FIG. 5 illustratively includes a low-energy seam detection module 502, an energy map generator 504, an interpolator 506, and an image regenerator 508. In various embodiments of the present invention, the system 500 can be utilized in one or more processors running software. For example, in one embodiment of the present invention, each system element can be a software component run on one or more processors with corresponding memory.

In accordance with an embodiment of the present invention, an input 502 comprising an image can be provided to the low-energy seam detection module 504. The low-energy seam detection module 504 can determine a low-energy seam of an image, as discussed above with respect to steps 102 and 402. To aid in defining a low-energy seam, the low-energy seam detection module 504 can utilize an energy map generator 506 to generate one or more energy maps of the image. Further, the low-energy seam detection module 504 can determine seams neighboring the low-energy seam, as discussed above with respect to step 104, and/or can determine neighborhoods of pixels surrounding the low-energy seam, as discussed above with respect to step 404. Thereafter, the energy values and the pixel brightness information for pixels in the low-energy seam, the neighboring seams and/or neighborhoods of pixels surrounding the low-energy seam can be provided to the interpolator 508. Additionally, the low-energy seam detection module 504 can provide, to the image regenerator 510, an indication of where the low-energy seam is located in the image as well as an indication of the location of neighboring seams in the image and/or the locations of neighborhoods of pixels in the image with their corresponding energy values After receiving the energy values and pixel brightness information from the low-energy seam detection module 504, the interpolator 508 can interpolate neighboring seams to form a new seam, as discussed above with respect to step 106. Moreover, the interpolator 508 can interpolate pixels adjacent to pixels in the neighborhoods surrounding pixels in the low-energy seam, as discussed above with respect to step 408. It should be noted that pixel brightness information and pixel distances can be received from the low-energy seam detection module 504. Alternatively, pixel brightness information and pixel distances can be determined by the interpolator 508 from the image of input 502, which can be received from the low-energy seam detection module 504, for example. Subsequent to interpolation, the pixel brightness information for the new seam and/or for the neighborhoods surrounding pixels in the low-energy seam can be provided to the image regenerator 510.

The image regenerator 510 can receive the image 502. As stated above, the image regenerator 510 can also receive the locations of the low-energy seam, the neighboring seams, and/or the neighborhoods of pixels surrounding the low-energy seam with their corresponding energy values from the low-energy seam detection module 504. Further, as stated above, pixel brightness information for the new seam and/or for the neighborhoods of pixels surrounding pixels in the low-energy seam can be received from the interpolator 508. Utilizing data received from the low-energy seam detection module 504 and from the interpolator 508, the image regenerator adds a new seam to the image and optionally removes the neighboring seam with the lowest energy, as discussed above with respect to steps 108 and 110. In addition, the image regenerator 510 can resize the image and regenerate pixels in the neighborhoods surrounding the pixels in the low-energy seam, as discussed above with respect to steps 406 and 408.

Thereafter, the image regenerator 510 can determine whether the resized and/or regenerated image is the desired size. If the image is the proper size, then the resized and/or regenerated image is output by the image regenerator 510 along, for example, line 512. Otherwise, the image regenerator 510 can communicate the resized and/or regenerated image to the low-energy seam detection module 506 and/or the interpolator 508 and can drive the low-energy seam detection module 506 and the interpolator 508 to repeat any of the methods of the embodiments of the present invention as described above until the image is the proper size, as discussed above with respect to methods 100 and/or 400. If the method of the present invention is repeated, the low-energy seam detection module 504 can calculate the energy of the new seam and/or regenerated pixels, as discussed above with respect to steps 114 and/or 412, utilizing the energy map generator 506.

Having described embodiments for a method and system for image resizing based on, for example, interpolation enhanced seam operations (which are intended to be illustrative and not limiting), it is noted that modifications and variations can be made by persons skilled in the art in light of the above teachings. It is therefore to be understood that changes can be made in the particular implementations of the present principles disclosed which are within the scope and spirit of the present principles as outlined by the appended claims. While the forgoing is directed to various implementations of the present principles, other and further implementations of the present principles can be devised without departing from the basic scope thereof.

The invention claimed is:

1. A method for resizing an image comprising:
defining a low-energy seam in the image;
determining a pixel energy map having energy levels, wherein energy level is calculated based on gradient intensity measures;
interpolating neighboring seams into a new seam, wherein said interpolation is based on one-dimensional manifolds in a two dimensional image plane; and
combining the new seam formed from interpolation with the image such that the size of the image is reduced and the new seam replaces a low energy seam determined among the neighboring seams based on the energy map.

2. The method of claim 1, further comprising:
determining if the image is reduced to a first desired level and if is not reduced to a first desired level, calculating a new seam for further processing the seam based on the energy map so to reconfigure the image to a second desired size.

3. The method of claim 2, wherein the low energy seam is a seam with lowest energy among the seams of the image being resized.

4. The method of claim 3, further comprising:
removing a neighboring seam with an energy value lower than energy values of all other neighboring seams to reduce the image size.

5. The method of claim 1, wherein the adding increases the image size and energy of any two neighboring seams can be calculated from the energy map.

6. The method of claim 1, wherein the adding decreases the image size.

7. A system for resizing an image comprising:
a low-energy seam detection module configured to define a low-energy seam in the image and to determine seams neighboring the low-energy seam;
an interpolator configured to interpolate neighboring seams into a new seam; wherein said interpolating is based on one-dimensional manifolds in a two dimensional image plane;
an image regenerator configured to add the new seam to the image to resize the image; wherein said regenerator calculates a pixel energy map having energy levels, wherein energy level is determined based on gradient intensity measures and combines the new seam formed from interpolation with the image such that the size of the image is reduced and the new seam replaces a low energy seam determined among the neighboring seams based on the energy map.

8. The system of claim 7, wherein the image regenerator is further configured to remove a neighboring seam with an energy value lower than energy values of all other neighboring seams to reduce the image size.

9. The system of claim 7, wherein the energy of any two neighboring seams can be calculated from the energy map.

10. The system of claim 9, wherein the low energy seam is a seam with lowest energy among the seams of the image being resized.

11. The system of claim 9, wherein the image regenerator is further configured to remove a neighboring seam with an energy value lower than energy values of all other neighboring seams to reduce the image size.

* * * * *